United States Patent [19]
Russell et al.

[11] 3,907,095
[45] Sept. 23, 1975

[54] ARTICLE TRANSFER APPARATUS

[75] Inventors: Edward J. Russell, Gladwin, Mich.; Robert W. Tielrooy, Holland, Netherlands

[73] Assignee: Van Dam Machine Corporation of America, West Paterson, N.J.

[22] Filed: Sept. 19, 1973

[21] Appl. No.: 398,672

[52] U.S. Cl. .................... 198/25; 198/241
[51] Int. Cl.² ............................ B65G 47/91
[58] Field of Search ..... 198/20 R, 20 C, 25, 33 AC, 198/184, 241–243; 302/2; 214/1 B, 1 BS, 1 BH, 1 BT, 1 BV

[56] References Cited
UNITED STATES PATENTS

| | | | |
|---|---|---|---|
| 2,171,193 | 8/1939 | Ruau | 198/25 |
| 3,389,811 | 6/1968 | Frank | 302/2 R X |
| 3,477,558 | 11/1969 | Fleischauer | 198/184 |
| 3,587,816 | 6/1971 | Russell et al. | 198/20 R |
| 3,712,455 | 1/1973 | Anfossi et al. | 198/184 X |
| 3,760,453 | 9/1973 | Neumann | 198/25 X |

Primary Examiner—Evon C. Blunk
Assistant Examiner—James L. Rowland
Attorney, Agent, or Firm—Learman & McCulloch

[57] ABSTRACT

Apparatus for transferring articles such as plastic containers from article delivery means to article receiving means comprises article support means movable continuously along a transfer path extending between the delivery means and the receiving means, the support being air-pervious and in communication with suction means throughout the transfer path, whereby articles discharged from the delivery means to the support means may be retained on the latter by suction until such time as the articles traverse the transfer path whereupon they automatically are released to the receiving means.

1 Claim, 6 Drawing Figures

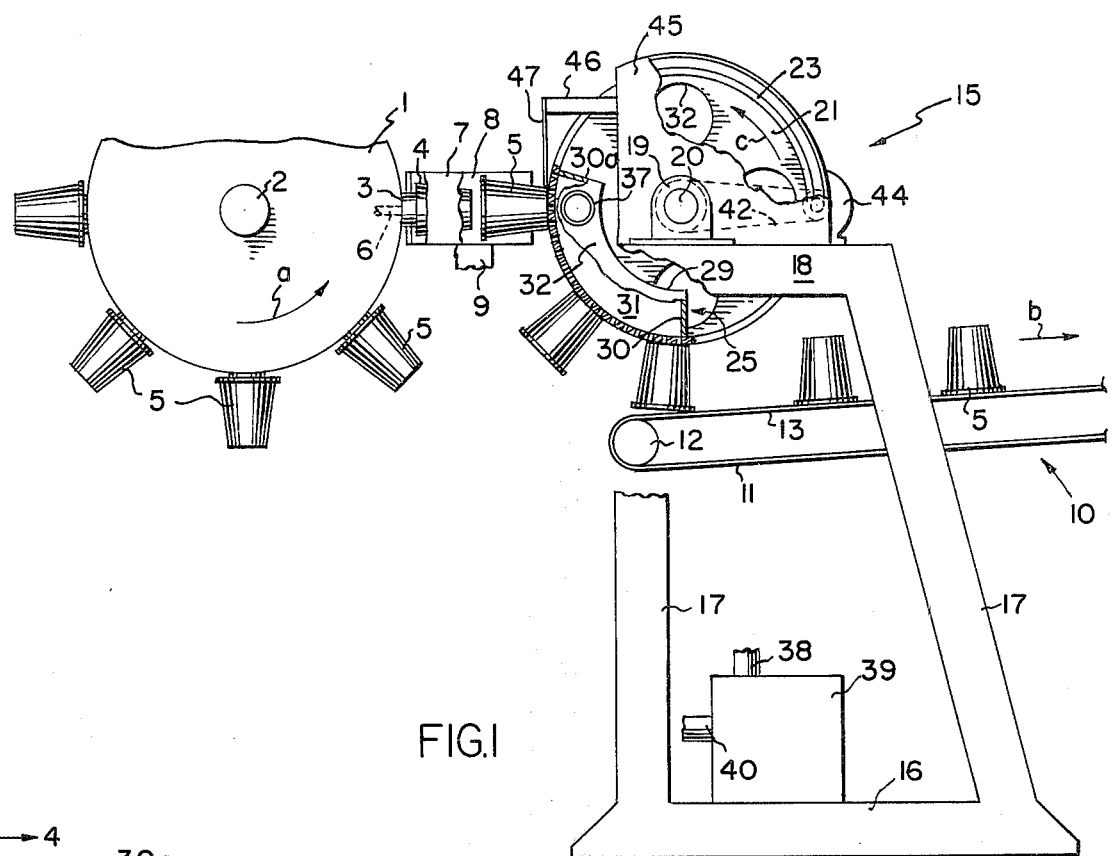
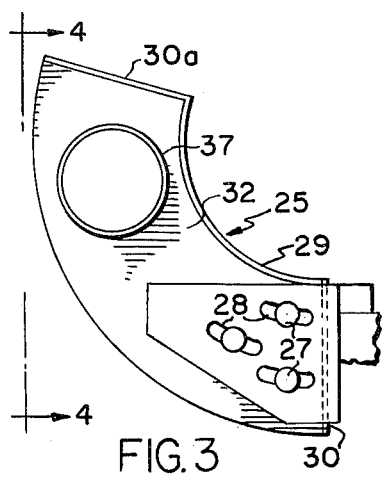
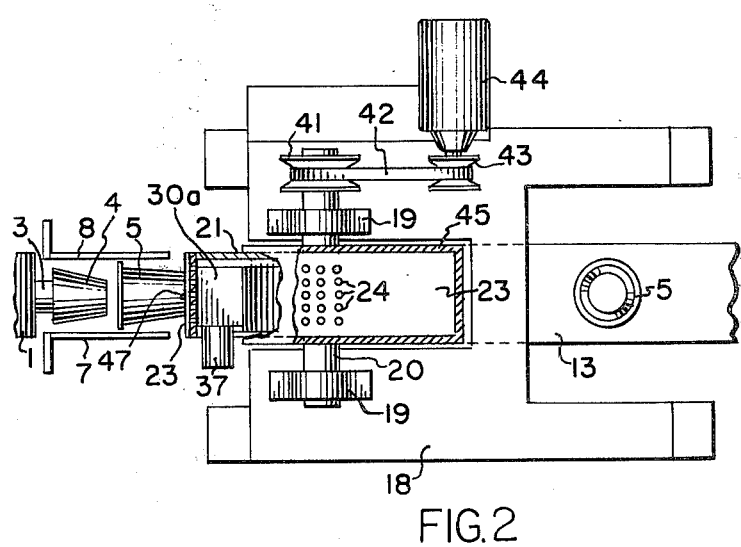
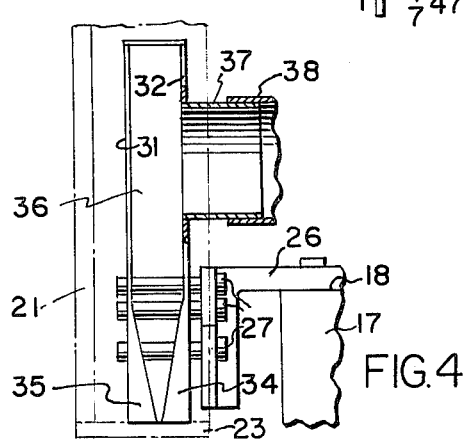
FIG.1
FIG.3
FIG.2
FIG.4

ARTICLE TRANSFER APPARATUS

The invention herein disclosed relates to apparatus for transferring containers or the like from a high speed, indexable delivery wheel to a movable receiving conveyor and more particularly to a continuously moving transfer mechanism which is capable of receiving containers discharged from the delivery wheel and supporting such containers by suction until they have been moved to a position in which they may be discharged to the receiving conveyor, and wherein the discharge of the conveyors from the transfer mechanism is effected automatically.

For a number of years it has been conventional to form containers such as cups, tubs, and the like from plastics materials and to print the exterior of such containers. The containers must be handled individually during and after printing so as to enable the ink to dry or otherwise cure without smearing. Some of the container printing machines currently in use are capable of printing in excess of 300 containers per minute. Such printers conventionally employ a rotary wheel provided with a plurality of radially extending mandrels on each of which a container may be supported for presentation to printing plates or the like supported at a printing station. The rotary wheel is indexed step by step from the printing station so as to present each printed container at a discharge zone at which it is discharged from the rotary wheel and transferred by a transfer mechanism to a conveyor which conducts the containers through ink-drying or curing operations.

Although the known container printing apparatus is capable of operating at extremely high speeds, it has not been possible heretofore to transfer the containers from the printing apparatus to the receiving conveyor at speeds approaching that of the printing apparatus. As a consequence, the rate at which containers are printed is limited, not so much by the printing apparatus itself, but rather by the rate of operation of the transfer mechanism.

In attempting to improve the speed of transfer of printed containers many proposals have been made. For example, it has been proposed to drop the printed containers vertically onto a horizontal conveyor. It also has been proposed to discharge conveyors from the rotary wheel into an arcuate chute which delivers the containers in an upside down condition to a horizontal conveyor. It also has been proposed to pick containers off the rotary wheel by means of a rotatable, vacuum mechanism which indexes in timed relation to the indexing of the printing wheel. Although all of such prior proposals have been operable, none of them has been capable of transferring containers at a speed approaching the speed at which the containers can be printed.

In addition to the inability of the prior art transfer mechanisms to accommodate containers at a satisfactorily rapid rate, such mechanisms have required the provision of fairly complex and delicate timing mechanisms to synchronize the operation of the transfer mechanism with the delivery of the containers to the transfer zone. Such timing devices represent not only an initial capital investment, but also require continuous maintenance and adjustment by skilled workers.

An object of this invention is to provide transfer apparatus especially adapted for use with an indexable container delivery wheel for transferring printed containers from the wheel to a continuously movable conveyor and wherein the transfer apparatus is operable continuously and at a speed approaching the maximum speed of the printing apparatus.

Another object of the invention is to provide transfer apparatus of the kind referred to and which avoids the necessity of providing timing or synchronizing apparatus.

A further object of the invention is to provide continuously movable container transfer means which is operable with an indexable delivery wheel of virtually any diameter.

Other objects and advantages of the invention will be pointed out specifically or will become apparent from the following description when it is considered in conjunction with the appended claims and the accompanying drawings, in which:

FIG. 1 is a fragmentary, side elevational view of transfer apparatus constructed in accordance with one embodiment of the invention and interposed between an indexable delivery wheel and a continuously movable receiving conveyor, certain parts being broken away for purposes of clarity;

FIG. 2 is a fragmentary, top plan view of the apparatus shown in FIG. 1 with certain parts again being broken away for clarity;

FIG. 3 is a fragmentary, enlarged, side elevational view of a portion of the apparatus shown in FIGS. 1 and 2;

FIG. 4 is a sectional view taken on the line 4—4 of FIG. 3;

Figure 5:
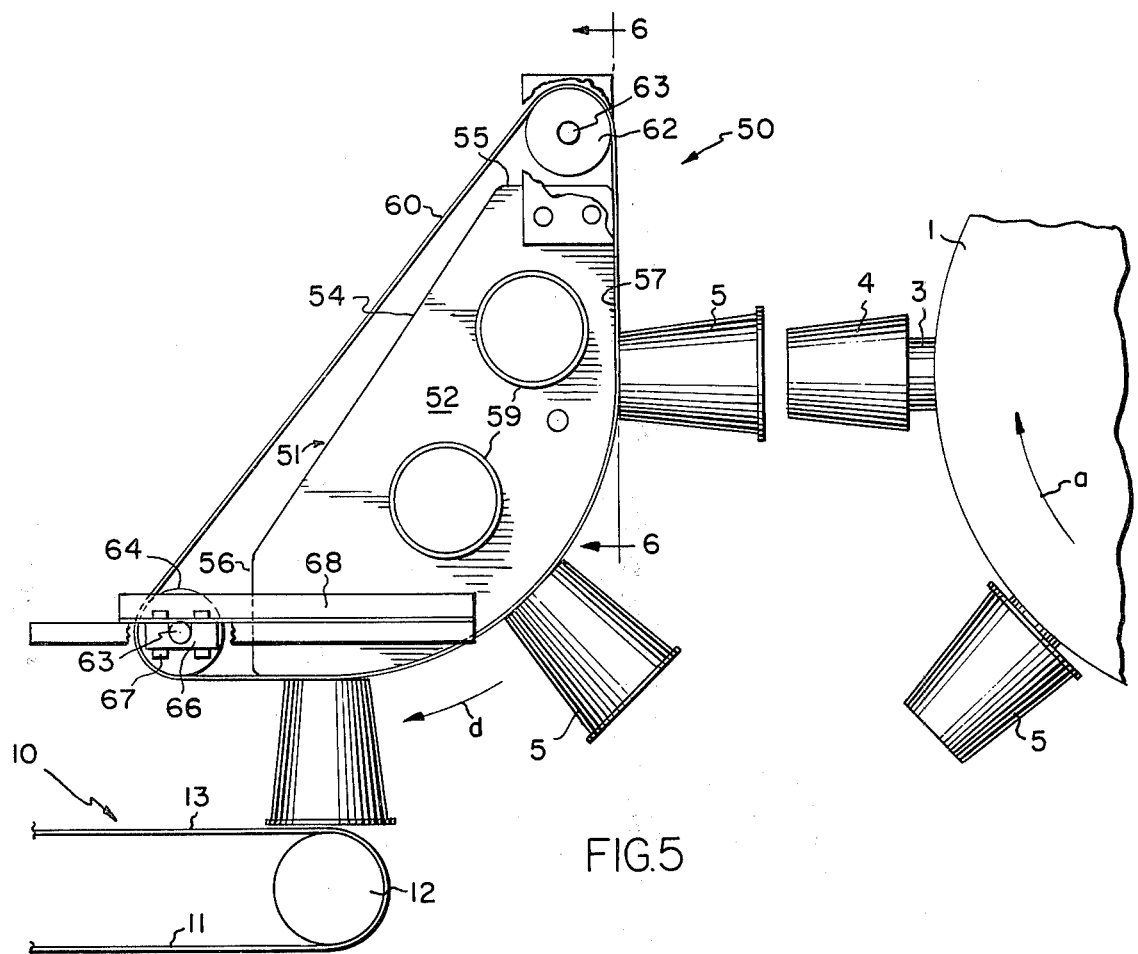
FIG. 5 is a fragmentary, side elevational view of transfer apparatus constructed in accordance with a second embodiment of the invention.

Apparatus constructed in accordance with the embodiment illustrated in FIGS. 1–4 is adapted for use in connection with a known container printing mechanism, such as that shown in U.S. Pat. No. 3,587,816, having a rotary delivery wheel 1 indexable step by step about the axis of a shaft 2. The wheel has on its periphery a plurality of radially extending, circumferentially spaced supports 3 on each of which is mounted a mandrel 4 of such size and shape as to fit snugly within a container 5. The wheel is indexed step-by-step by mechanism (not shown) counterclockwise in the direction of the arrow *a*. At some point in its movement, usually at the 12:00 o'clock position, each mandrel 4 passes beneath a stack (not shown) of unprinted, nested containers 5. At that point a container is fitted onto the mandrel, whereupon the wheel indexes to deliver the unprinted container to a printing press (not shown) so that the exterior of the container is printed. From the printing press the wheel 1 is indexed step-by-step so as to present each printed container to a discharge point which corresponds to the 3:00 o'clock position, as shown in FIG. 1.

At the discharge point is a suitable stripping device for removing each container from its associated mandrel. In the disclosed embodiment, the stripper device comprises a tube 6 communicating with passages (not shown) in the members 3 and 4 and through which pressure fluid may be delivered against the bottom of the container so as to blow the latter off the mandrel. Preferably, a pair of spaced apart guide plates 7 and 8 straddle the container 5 at the discharge point so as to prevent erratic movement of the container. The guide plates are mounted on a suitable support 9.

The transfer apparatus also is adapted for use in conjunction with a receiving conveyor 10 comprising an endless belt 11 trained around driven pulleys 12 and having an upper run 13 adapted to receive each successive container 5 and deliver it in the direction of the arrow *b* to an ink drying or curing station (not shown).

The apparatus described thus far is conventional and forms no part of the invention per se except insofar as it cooperates with the apparatus subsequently to be described.

Transfer apparatus according to the embodiment shown in FIGS. 1–4 is represented generally by the reference character 15 and comprises a frame 16 having side members 17 which straddle the conveyor 10 and are joined at their upper ends by a cross member 18. Bearing supports 19 fixed on the frame members 18 journal a shaft 20 which preferably is located at a level corresponding to that of the shaft 2. On the shaft 20 is fixed a disc 21 having openings 22 therein for the purpose of minimizing its weight. At the periphery of the disc 21 is secured an annular support member or flange 23. The flange 23 has a plurality of apertures 24 therein so as to render the flange air-pervious.

Nested within the flange 23 is a housing 25 which is mounted on one of the frame members 18 by a bracket 26 and bolts 27. The bolts extend through arcuate openings 28 provided in the bracket so as to enable the housing 25 to be shifted circumferentially of the flange 23 for a purpose presently to be explained.

The housing 25 has a rear wall 29, end walls 30 and 30a, and side walls 31 and 32. For a majority of its length the housing has no front wall, but adjacent the end wall 30 of the housing are opposed flanges 34 and 35 which converge toward the adjacent end wall. The construction is such that the housing has an elongate front opening or air passage 36, the cross sectional area of which diminishes toward the wall 30.

The side wall 32 has an outlet tube 37 on which is fitted one end of a hose 38, the other end of which is fitted to the intake side of a suction pump or blower 39. The discharge side of the pump communicates with a conduit 40 which, if desired, may have a connection with the tube 6 previously described.

The side and end walls of the housing 25 fit closely to the inner surface of the support flange 23 so that, upon operation of the pump 39, a subatmospheric pressure will be created in the housing 25 and a continuous flow of air into the housing occurs through the apertures 24 in that portion of the flange which overlies the opening 36 of the housing.

At one end of the shaft 20 is fixed a pulley 41 around which is trained a driving belt 42. The belt also is trained around a pulley 43 that is fixed to the driving shaft of a continuous operable electric motor 44. The arrangement is such that the disc 21 and the support flange 23 may be driven continuously in the direction of the arrow *c*.

For safety purposes the disc and the flange 23 are partially closed by a cover 45 that is mounted on the frame member 18. The cover preferably includes a support arm 46 to which is fixed one end of a thin, flexible deflector or finger 47, the opposite end of which is free and lies adjacent the periphery of the support flange 23. The deflector 47 does not extend to a level corresponding to that of the axis of the shaft 20, but terminates short of such level. Preferably, the spacing between the horizontal plane of the shaft 20 and the free end of the deflector 47 is slightly less than one-half the diameter of the bottom of a container 5.

In the operation of the apparatus thus far described, the wheel 1 is indexed step by step so as to present each of the containers 5 in succession to the discharge point and between the guide plates 7 and 8. A blast of air will be discharged through the tube 6 so as to propel the container off its mandrel 4 and toward the continuously rotating transfer flange 23. About the time the bottom of the container 5 engages the flange 23, the container also will engage the free end of the deflector 47, thereby slightly cocking the container 5 and facilitating the seating of its bottom on the flange 23. The subatmospheric pressure within the housing 25 will cause the container to be retained by suction against the flange 23 as the latter rotates along an arcuate transfer path leading from the discharge point of the rotary wheel to the receiving conveyor 10. The arcuate length of the housing 25 and, consequently, the length of the opening 36, is such that, as each successive container 5 approaches a vertical, upside down position overlying the upper run 13 of the conveyor belt 11, the flange 23 passes the housing end wall 30, whereupon the air flow through the associated apertures of the flange terminates. The container thus drops by gravity onto the conveyor and is conveyed away from the transfer apparatus. Preferably, the linear speed of the conveyor 10 corresponds to the peripheral speed of the containers.

The reduced cross sectional area of the passage 36 performs two functions. Firstly, it makes possible a greater velocity of air flow through the perforations 24 adjacent the zone at which a container first engages the flange 23, thereby helping to prevent rebound of the container. Secondly, the taper of the opening 36 provides a gradually diminishing suction force acting on each container as it approaches the receiving conveyor, thereby providing for a gradual release of each container and avoiding sudden pressure fluctuations within the housing 25.

The angular position of the housing 25 relative to the support flange 23 may be adjusted via the bolts 27 and the arcuate slots 28 so as to provide for the most efficient delivery of containers to the conveyor 10.

Although the deflector 47 assists in avoiding rebound problems associated with most containers, rebound tendencies can be diminished further by providing a thin layer of soft, perforated material on the periphery of the flange. Such material may be a soft polyurethane foam having perforations aligned with the perforations 24.

An important consideration in the positioning of the transfer mechanism 15 is that the axes of the shafts 2 and 20 should be parallel and at the same level. If this relationship is observed, then the transfer mechanism may be used with a delivery wheel of virtually any diameter.

Figure 6:
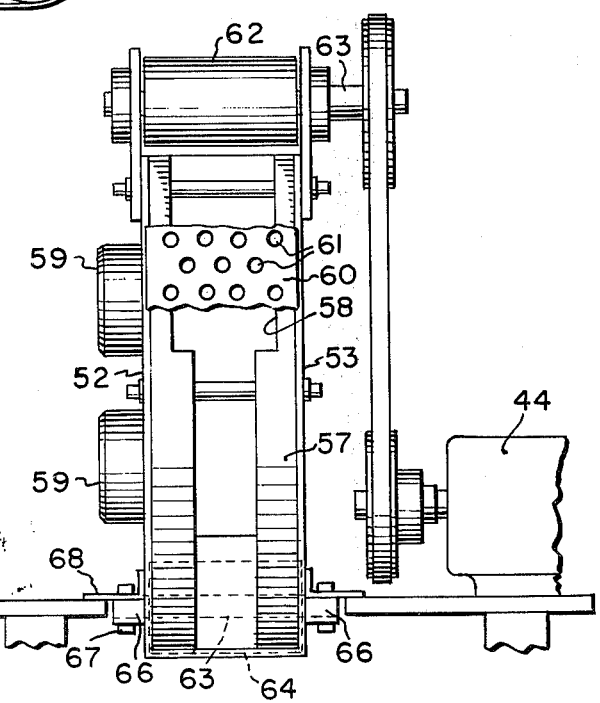
FIG. 6 is a view taken along the line 6—6 of FIG. 5, but with certain parts broken away for purposes of illustration.

Transfer apparatus according to the embodiment shown in FIGS. 5 and 6 is designated generally by the reference character 50 and is adapted for use with the same printer wheel 1 described earlier. The modified transfer apparatus comprises a housing 51 having parallel side walls 52 and 53, a rear wall 54, and end walls 55 and 56. The housing 51 also has a front wall 57 having an elongate opening or air passage 58 therein, the cross sectional area of which again diminishes in a direction toward the end wall 56. The side wall 52 is provided with a pair of fittings 59 which may be connected by hoses (not shown) to the suction pump 39.

An endless, flexible support belt 60 having perforations 61 therein overlies the front wall 57 of the housing. The belt 60 is trained around a roller 62 that is fixed on a shaft 63. The belt also is trained around a roller 64 fixed on a shaft 65 which has its ends supported in blocks 66. The blocks may be fixed by bolts 67 in a selected position relative to guide rails 68 carried by the housing so as to maintain the belt taut. The belt is driven continuously in the direction of the arrow *d* by the motor 44 and associated driving means.

In the operation of the apparatus shown in FIGS. 5 and 6, containers 5 are discharged from the wheel 1 at the 9:00 o'clock position in the same manner previously described, it being understood that guides similar to the guides 7 and 8 may be utilized if desired. The bottom of each container will strike the support belt 60 and will be held thereon by suction as the belt traverses the transfer path defined by the opening 58. When that portion of the belt which carries a container 5 passes the end wall 56 of the housing 51, the container will be released for discharge to the conveyor 10.

That portion of the belt 60 directly opposite the point of discharge of containers from the delivery wheel 1 preferably is flat and vertical. As a consequence, the entire bottom surface of a container will engage the belt at the moment of impact, thereby enabling the suction to prevent rebound.

Apparatus like that disclosed herein has transferred containers at a rate in excess of 330 per minute. This rate is considerably greater than that at which any other known apparatus operates.

The disclosed embodiments are representative of presently preferred forms of the invention, but are intended to be illustrative rather than definitive thereof. The invention is defined in the claims.

We claim:

1. Apparatus for transferring flat bottomed cup-shaped articles from a first article conveying means to a second article conveying means; said apparatus comprising an endless perforate conveying member mounted for movement along a circular path having a horizontal axis with a first section of of said path extending through an arc of approximately 90° with one end of said first section being horizontally aligned with said axis and disposed in spaced horizontally opposed relationship to an article discharge station on said first conveying means and the opposite end of said first section being spaced downwardly from said one end and disposed in spaced opposed vertically overlying relationship to an article receiving station on said second conveying means, drive means for driving said endless conveying member along said path from said one end of said first section downwardly along said first section toward said opposite end, pneumatic means on said first article conveying means at said discharge station for blowing an article bottom end first from said first conveying means into contact with said endless conveying member at said one end of said first section of said path, a deflector finger projecting downwardly in tangential relationship to said endless path at said one end of said first section and having a lower end terminating slightly above a horizontal plane containing said axis to engage the uppermost portion of the bottom of an article as said article first contacts said endless conveying member, suction means underlying said endless perforate conveying member along said first section of said path operable to retain an article on said endless conveying member during movement therewith from said one end of said first section to said opposite end and to release said article upon arrival at said opposite end of said first section to permit said article to drop bottom up onto said second conveying means at said receiving station.

\* \* \* \* \*